(12) United States Patent
Liu

(10) Patent No.: US 9,140,242 B2
(45) Date of Patent: Sep. 22, 2015

(54) TEMPERATURE DIFFERENTIAL ENGINE DEVICE

(75) Inventor: Angfeng Liu, Shandong (CN)

(73) Assignee: ZIBO NATERGY CHEMICAL INDUSTRY CO., LTD., Shandong (CN)

( * ) Notice: Subject to any disclaimer, the term of this patent is extended or adjusted under 35 U.S.C. 154(b) by 88 days.

(21) Appl. No.: 13/577,644

(22) PCT Filed: Feb. 9, 2011

(86) PCT No.: PCT/CN2011/000198
§ 371 (c)(1),
(2), (4) Date: Aug. 7, 2012

(87) PCT Pub. No.: WO2011/097952
PCT Pub. Date: Aug. 18, 2011

(65) Prior Publication Data
US 2012/0304638 A1    Dec. 6, 2012

(30) Foreign Application Priority Data

Feb. 9, 2010    (CN) .......................... 2010 1 0111209

(51) Int. Cl.
*F01K 25/08*    (2006.01)
*F01K 25/10*    (2006.01)
(Continued)

(52) U.S. Cl.
CPC ....................................... *F03G 7/04* (2013.01)

(58) Field of Classification Search
CPC ....... F01K 25/08; F01K 25/065; F01K 25/06; F01K 25/10; F02G 1/04; F02G 1/043; F02G 1/02; F02G 7/06; F03G 7/04; F03G 7/06

USPC ..................... 60/516, 531, 649, 671
See application file for complete search history.

(56) References Cited

U.S. PATENT DOCUMENTS 2,182,098 A * 12/1939 Sellew ............................. 62/79
3,175,953 A * 3/1965 Nettel et al. .................. 376/384
(Continued)

FOREIGN PATENT DOCUMENTS

AU    2011214821 A1    9/2012
CN       2177815 Y     9/1994
(Continued)

OTHER PUBLICATIONS

Canadian Office Action for Canadian Patent Application No. 2,789,388, dated Oct. 22, 2013, 3 pages.
(Continued)

*Primary Examiner* — Kenneth Bomberg
*Assistant Examiner* — Daniel Wagnitz
(74) *Attorney, Agent, or Firm* — Schwabe Williamson & Wyatt PC

(57) ABSTRACT

A temperature differential engine device includes a low-boiling-point medium steam turbine (1), a heat absorber (2), a thermal-insulating type low-temperature countercurrent heat exchanger (3), a circulating pump (4), and a refrigerating system (5) which are interconnected to constitute a closed circulating system filled with low-boiling-point medium fluid. The low-boiling-point medium steam turbine (1) and the heat absorber (2) constitute a low-density-medium heat-absorbing working system, and the circulating pump (4) and the refrigerating system (5) constitute a high-density-medium refrigerating-circulating system. The temperature differential engine device can transfer thermal energy into mechanical energy.

6 Claims, 1 Drawing Sheet

(51) Int. Cl.
*F01K 25/06* (2006.01)
*F02G 1/02* (2006.01)
*F02G 1/04* (2006.01)
*F02G 1/043* (2006.01)
*F03G 7/04* (2006.01)
*F03G 7/06* (2006.01)

(56) References Cited

U.S. PATENT DOCUMENTS

| | | | |
|---|---|---|---|
| 4,041,705 A | | 8/1977 | Siegel |
| 4,064,392 A | * | 12/1977 | Desalu ............................ 703/18 |
| 5,799,481 A | * | 9/1998 | Fetescu ............................ 60/783 |
| 6,170,263 B1 | * | 1/2001 | Chow et al. ..................... 60/649 |
| 8,418,466 B1 | * | 4/2013 | Hardgrave .................. 60/641.2 |
| 2003/0029169 A1 | * | 2/2003 | Hanna et al. ................... 60/651 |
| 2004/0083732 A1 | * | 5/2004 | Hanna et al. ................... 60/651 |
| 2004/0226296 A1 | * | 11/2004 | Hanna et al. ................... 60/671 |
| 2005/0183421 A1 | * | 8/2005 | Vaynberg et al. ............ 60/641.8 |
| 2012/0144830 A1 | * | 6/2012 | Ellert ............................ 60/641.8 |
| 2012/0227926 A1 | * | 9/2012 | Field et al. ...................... 165/10 |

FOREIGN PATENT DOCUMENTS

| | | |
|---|---|---|
| CN | 201045334 Y | 4/2008 |
| CN | 101270737 A | 9/2008 |
| JP | 2006138288 A2 | 6/2006 |
| JP | 2007500810 A | 1/2007 |
| JP | 2008519205 A | 6/2008 |
| JP | 2009536705 A | 10/2009 |
| KR | 1020077000233 A | 4/2007 |
| RU | 2116465 C1 | 7/1998 |

OTHER PUBLICATIONS

Egypt Office Action for Egyptian Patent Application No. 2012081367, dated May 8, 2012, 4 pages.
Eurasia Office Action for Eurasian Patent Application No. 201290763, dated May 30, 2014, 2 pages.
Eurasia Office Action for Eurasian Patent Application No. 201290763, dated Dec. 24, 2014, 4 pages.
Indonesia Office Action for Indonesian Patent Application No. W00-2012-03217, dated Oct. 3, 2014, 5 pages.
Korean Office Action for Korean Patent Application No. 10-2012-7022973, dated Oct. 1, 2013, 9 pages.
Korean Office Action for Korean Patent Application No. 10-2012-7022973, dated Apr. 29, 2014, 7 pages.
New Zealand First Examination Report for New Zealand Patent Application No. 601692, dated Jun. 7, 2013, 2 pages.
Philippine Examination Report for Philippine Patent Application No. 1/2012/501606, dated Sep. 3, 2014, 1 page.
Japanese Office Action for Japanese Patent Application No. 2012-551480, 11 pages.
Japanese Final Office Action for Japanese Patent Application No. 2012-551480, 6 pages.

* cited by examiner

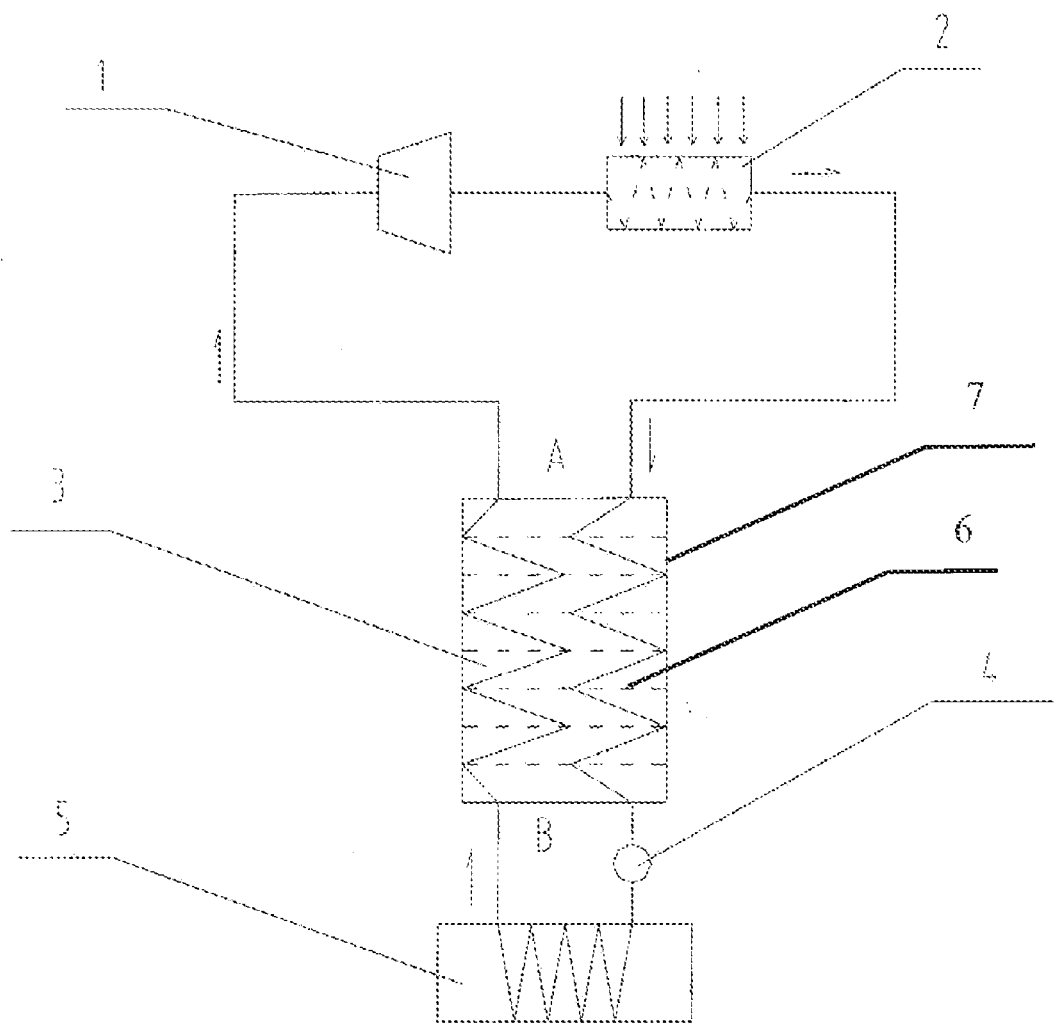

TEMPERATURE DIFFERENTIAL ENGINE DEVICE

BACKGROUND OF THE INVENTION

1. Field of the Invention

The invention relates to a temperature differential engine device which belongs to a type of device that transfers thermal energy into mechanical energy.

2. Background Information

A most widely used manner of utilizing energy by human beings is to transfer thermal energy into mechanical energy. A traditional manner for transferring energy is to transfer thermal energy into pressure potential energy first and then to do work externally. This leads to energy losses; besides energy losses, additional fossil energy resources will be consumed.

SUMMARY OF THE INVENTION

In order to overcome the above mentioned disadvantages associated with prior art, the invention discloses an engine device which dispenses with the pressure rising process during the course of transferring thermal energy into mechanical energy and thus directly transfers the energy emerging from molecular thermal motions into mechanical energy.

In addition, the invention aims to transfer thermal energy carried by fluids in natural environment into mechanical energy efficiently by means of the engine device proposed by the invention.

The aims of the invention are realized by means of the following countermeasures.

The temperature differential engine device according to the present invention includes a low-boiling-point medium steam turbine 1, a heat absorber 2, a thermal-insulating type low-temperature countercurrent heat exchanger 3, a circulating pump 4, and a refrigerating system 5, which are interconnected to constitute a closed circulating system filled with a low-boiling-point medium fluid, wherein:

a. the low-boiling-point medium steam turbine 1 and the heat absorber 2 constitute a low-density-medium heat-absorbing working system, and the circulating pump 4 and the refrigerating system 5 constitute a high-density-medium refrigerating-circulating system; transverse heat transfer is realized between the fluids via the thermal-insulating type low-temperature countercurrent heat exchanger 3;

b. the thermal-insulating type low-temperature countercurrent heat exchanger 3 comprises a high-temperature end A and a low-temperature end B; the heat exchanger walls 7 are longitudinally heat-insulated with each other by means of heat-insulating layers 6 within the heat exchanger; the temperatures of the fluids gradually change from the high-temperature end to the low-temperature end longitudinally; and the fluids exchange heat transversely with each other via the heat exchanger walls 6;

c. the low-boiling-point medium flows from the heat-absorbing working system into the thermal-insulating type low-temperature countercurrent heat exchanger 3, and flows from the high-temperature end A to the low-temperature end B during which the medium transfers from the gaseous state to the liquid state or a state in a higher density; then the medium flows through the refrigerating-circulating system, and recirculates from the low-temperature end B to the high-temperature end A during which the medium transfers from the liquid state or a state in a higher density to the gaseous state; there exists a heat exchange in a counterflow manner in the thermal-insulating type low-temperature countercurrent heat exchanger 3 between the medium flows;

d. the heat absorber 2 may be placed before or after the low-boiling-point medium steam turbine 1 so as to compensate for thermal energy consumption of the system which is utilized to do work externally by the low-boiling-point medium steam turbine 1; in this way system's energy maintains balanced.

The low-boiling-point medium steam turbine 1 is a device which outputs mechanical energy externally, and the heat absorber 2 absorbs heat from outside. Among other things, the thermal-insulating type low-temperature countercurrent heat exchanger 3 mainly functions to prevent the medium which flows to the low-temperature end B from carrying heat thereto as much as possible, so as to ensure that the medium in the low-temperature zone is in liquid state or in a higher density state and thus the workload of the refrigerating-circulating system is reduced. The circulating pump 4 mainly functions to ensure that the medium circulates in the system along the desired direction. Since the differential pressure of the system is small and the medium in liquid state flows at a low speed, the power consumption of the circulating pump 4 is low. The refrigerating system 5 mainly functions to dissipate the heat which is carried with the fluid, the heat introduced therein due to imperfect heat-insulation, and the heat generated during the working of circulating pump 4, such that the medium is maintained at low temperatures.

The thermal-insulating type low-temperature countercurrent heat exchanger 3 divides the system into a low-temperature portion which refrigerates and circulates and a high-temperature portion which absorbs heat and works. The temperatures of both the high-temperature and the low-temperature portions are lower than that of the outside fluid which supplies heat to the heat absorber 2. The low-temperature circumstance of the high-density-medium refrigerating-circulating system is maintained via the refrigerating system and the thermal-insulating layers thereof. The high-temperature portion includes the low-boiling-point medium steam turbine 1 and the heat absorber 2. The heat absorber 2 absorbs heat from the outside fluid, so that the low-boiling-point medium steam turbine 1 utilizes the heat absorbed by the heat absorber 2 to do work, after which the heat absorber 2 absorbs heat from the outside fluid again, such that heat consumption of the system is compensated and thus system's energy maintains balanced.

Alternatively, the aims of the invention can also be realized by the following countermeasures.

In the temperature differential engine device according to the invention, the thermal-insulating type low-temperature countercurrent heat exchanger 3 is chosen from any one or various combinations of one or more of a plate type heat exchanger, a pipe type heat exchanger and a fin type heat exchanger.

In the temperature differential engine device according to the invention, the thermal-insulating type low-temperature countercurrent heat exchanger 3 includes a plurality of stages along the flow direction, with thermal-insulating pad layers interposed therebetween. In this way heat transferring toward the low-temperature zone along the heat exchanger walls is prevented. The in-coming and out-going (counterflow) fluids exchange heat transversely with each other via the heat exchanger walls.

In the temperature differential engine device according to the invention, the heat absorber 2 and the low-boiling-point medium steam turbine 1 may be consecutively assembled in one group or multiple groups. The more the heat absorber 2 and the low-boiling-point medium steam turbine 1 are consecutively assembled in one group or multiple groups, the more mechanical energy will be output externally, without increasing the workload of the refrigerating system 5 and the circulating pump 4 in the low-temperature portion.

In the temperature differential engine device according to the invention, the thermal-insulating type low-temperature countercurrent heat exchanger 3 may be omitted. In case that multiple groups of the heat absorber 2 and the low-boiling-point medium steam turbine 1 are serially connected in multiple groups, the thermal-insulating type low-temperature countercurrent heat exchanger 3 may also be omitted, because more mechanical work will be output externally. In this case, the refrigerating system 5 can fulfill the task of maintaining a low-temperature condition in place of the thermal-insulating type low-temperature countercurrent heat exchanger 3. The energy consumed by the refrigerating system 5 and the circulating pump 4 will be less than the sum of energy output from the plurality of steam turbines 1.

In the temperature differential engine device according to the invention, the flow speed of the medium fluid that drives the low-boiling-point medium steam turbine 1 to rotate can be adjusted by changing the diameter of the inlet pipe of the steam turbine. In this way, different technical conditions of engines with a variety of different requirements can be accommodated.

The temperature differential engine device according to the invention is adapted to be used in any circumstances in natural environment comprising fluids as heat sources, including air as heat sources and water as heat sources.

The temperature differential engine device according to the invention is adapted to be used in engines of automobiles, ships, airplanes and the engines of thermal power plants.

The solutions of the temperature differential engine device according to the invention and the application thereof disclosed as above provide prominent substantive features and a notable progress over the prior art as follows:

1. The invention provides an engine device which dispenses with the pressure rising process during the course of transferring thermal energy into mechanical energy and thus directly transfers the energy emerging from molecular thermal motions into mechanical energy;

2. The invention can transfer thermal energy carried by fluids existing in natural environment into mechanical energy efficiently; and 3. The invention provides an engine device which is not constrained by the temperate of the natural environment and the sunshine.

BRIEF DESCRIPTION OF THE DRAWINGS

The present invention will be illustrated in more detail from the following description taken in conjunction with the accompanying drawings, in which:

FIG. 1 is an explanatory view of the principle of the temperature differential engine device according to the invention, wherein the reference numbers are defined as follows:

1 a low-boiling-point medium steam turbine 1;
2 a heat absorber;
3 a thermal-insulating type low-temperature countercurrent heat exchanger;
4 a circulating pump;
5 a refrigerating system.

DETAILED DESCRIPTION OF AN ILLUSTRATIVE EMBODIMENT

Hereinafter, the invention will be further explained with reference to the following embodiment.

The First Embodiment of the Invention

The temperature differential engine device according to the present invention includes a low-boiling-point medium steam turbine 1, a heat absorber 2, a thermal-insulating type low-temperature countercurrent heat exchanger 3, a circulating pump 4, and a refrigerating system 5, which are interconnected to constitute a closed circulating system filled with a low-boiling-point medium fluid, wherein:

a. the low-boiling-point medium steam turbine 1 and the heat absorber 2 constitute a low-density-medium heat-absorbing working system, and the circulating pump 4 and the refrigerating system 5 constitute a high-density-medium refrigerating-circulating system; transverse heat transfer between the fluids is realized via the thermal-insulating type low-temperature countercurrent heat exchanger 3;

b. the thermal-insulating type low-temperature countercurrent heat exchanger 3 comprises a high-temperature end A and a low-temperature end B; the heat exchanger walls are longitudinally heat-insulated with each other by means of heat-insulating layers within the heat exchanger; the temperatures of the fluids gradually change from the high-temperature end to the low-temperature end longitudinally; and the fluids exchange heat transversely with each other via the heat exchanger walls;

c. the low-boiling-point medium flows from the heat-absorbing working system into the thermal-insulating type low-temperature countercurrent heat exchanger 3, and flows from the high-temperature end A to the low-temperature end B during which the medium transfers from the gaseous state to the liquid state or a state in a higher density (liquefaction); then the medium flows through the refrigerating-circulating system, and recirculates from the low-temperature end B to the high-temperature end A during which the medium transfers from the liquid state or a state in a higher density to the gaseous state (vaporization); there exists a heat exchange in a counterflow manner in the thermal-insulating type low-temperature countercurrent heat exchanger 3 between medium flows;

d. the heat absorber 2 may be placed before or after the low-boiling-point medium steam turbine 1 so as to compensate for thermal energy consumption of the system which is utilized to do work externally by the low-boiling-point medium steam turbine 1; in this way system's energy maintains balanced.

The thermal-insulating type low-temperature countercurrent heat exchanger 3 is a fin type heat exchanger.

The thermal-insulating type low-temperature countercurrent heat exchanger 3 may include a plurality of stages, with heat-insulating pad layers interposed therebetween.

The heat absorber 2 and the low-boiling-point medium steam turbine 1 may be consecutively assembled in one group or multiple groups.

The medium which is used to absorb, transfer heat, and transfer thermal energy into mechanical energy is refrigenerating medium R22.

The engine device may find applications in engines of automobiles, ships, airplanes and engines of electricity generating plants.

The invention claimed is:

1. A temperature differential engine device, characterized in that, it includes a low-boiling-point medium steam turbine (1), a heat absorber (2), a thermal-insulating low-temperature countercurrent heat exchanger (3) coupled to the heat absorber, a circulating pump (4) coupled to the heat exchanger, and a refrigerating system (5) coupled to the heat exchanger, which are interconnected to constitute a closed circulating system for a low-boiling-point medium within, wherein:
- a. the low-boiling-point medium steam turbine (1) and the heat absorber (2) constitute a low-density-medium heat-absorbing working system, and the circulating pump (4) and the refrigerating system (5) constitute a high-density-medium refrigerating-circulating system; transverse heat transfer is realized through the thermal-insulating low-temperature countercurrent heat exchanger (3);
- b. the thermal-insulating low-temperature countercurrent heat exchanger (3) comprises a high-temperature end (A) a low-temperature end (B), one or more heat-insulating layers, and a heat exchanger wall divided into a plurality of heat-insulated sections by the one or more heat-insulating layers within the heat exchanger; and the medium exchange heat transversely within each heat-insulated section with each other via the heat exchanger wall;
- c. the heat absorber (2) is connected to the low-boiling-point medium steam turbine (1) to compensate for thermal energy consumption by the low-boiling-point medium steam turbine (1).

2. The temperature differential engine device according to claim 1, characterized in that, the thermal-insulating low-temperature countercurrent heat exchanger (3) includes a plate heat exchanger, a pipe heat exchanger, or a fined heat exchanger.

3. The temperature differential engine device according to claim 1, characterized in that, the thermal-insulating low-temperature countercurrent heat exchanger (3) includes a plurality of stages for heat exchange along a flow direction of the medium based on the one or more heat-insulating layers wherein the one or more heat-insulating layers include at least one thermal-insulating pad layer.

4. The temperature differential engine device according to claim 1, characterized in that, the heat absorber (2) and the low-boiling-point medium steam turbine (1) are consecutively assembled in one group.

5. The temperature differential engine device according to claim 1, characterized in that, a flow speed of the medium which drives the low-boiling-point medium steam turbine (1) to rotate is adjustable by the steam turbine.

6. The temperature differential engine device according to claim 1, wherein the temperature differential engine device is configured to use a fluid as a heat source.

\* \* \* \* \*